(No Model.)
C. E. BALL.
ARMATURE FOR DYNAMO ELECTRIC MACHINES.
No. 257,999. Patented May 16, 1882.
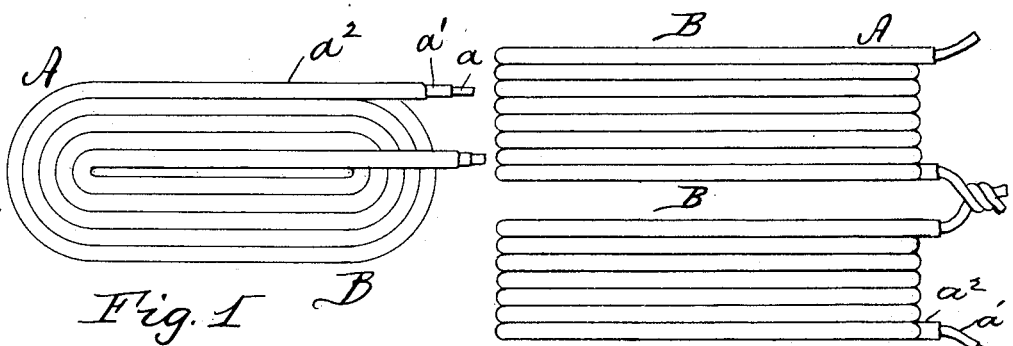
Fig. 1. Fig. 2.
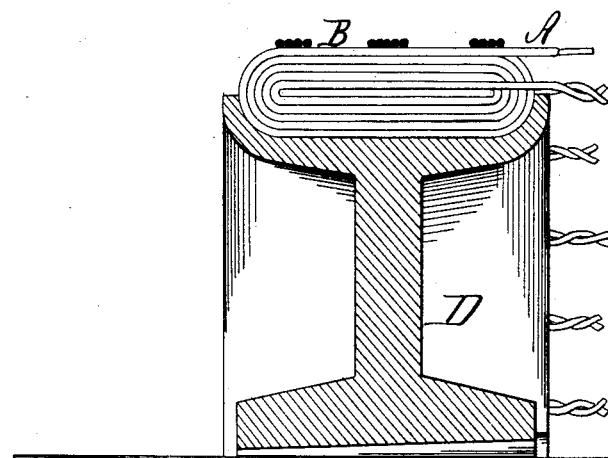
Fig. 3.
WITNESSES:
S. J. Van Stavoren
S. L. Jones
INVENTOR,
Chas. E. Ball
By Connolly Bros.,
ATTORNEYS.
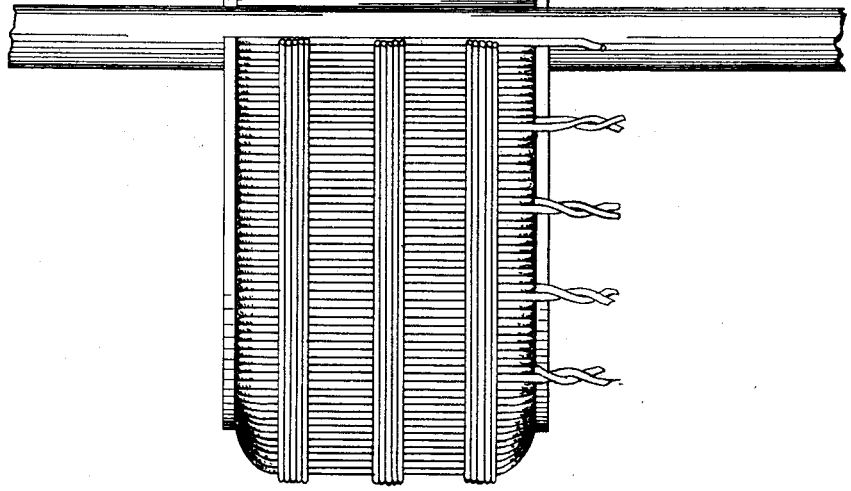
N. PETERS. Photo-Lithographer, Washington, D. C.

UNITED STATES PATENT OFFICE.

CHARLES E. BALL, OF PHILADELPHIA, PENNSYLVANIA.

ARMATURE FOR DYNAMO-ELECTRIC MACHINES.

SPECIFICATION forming part of Letters Patent No. 257,999, dated May 16, 1882.

Application filed February 25, 1882. (No model.)

*To all whom it may concern:*

Be it known that I, CHARLES E. BALL, a citizen of the United States, residing at Philadelphia, in the county of Philadelphia and State of Pennsylvania, have invented certain new and useful Improvements in Armatures for Dynamo-Electric Machines; and I do hereby declare the following to be a full, clear, and exact description of the invention, reference being had to the accompanying drawings, which form part of this specification, in which—

Figure 1 is a side elevation of one of the coils of my improved armature. Fig. 2 is a plan of two of the same; and Fig. 3 is an elevation, partly sectional, of my improved armature.

My invention has for its object to provide means for obtaining increased induction and general efficiency in the armatures of dynamo-electric machines.

It is well understood that electric induction is influenced by distance; or, conversely, that the closer the inducing-magnet or other agent is to the armature or other object in which an induced current is to be generated, the parts not being in contact, the more powerful such current will be. In obedience to this principle, it has been the aim of originators and manufacturers of dynamo-electric machines to so construct such machines that the armatures thereof will approach the poles of the field-magnets as closely as possible without touching the latter. Owing to its superior magnetic properties, iron is quite generally or solely used as the core of the armatures of dynamo-electric machines; but copper, having better conductivity, is mainly employed in forming the helices or coils which surround the iron core, such copper being usually in the form of wire duly insulated. Hence armatures for machines of the class mentioned are generally composed of a central iron core wrapped with insulated copper wire. Inasmuch as the copper wire encircles the iron core, the latter is necessarily removed from the pole-pieces of the field-magnets a distance equal to the depth of the wire wrapping.

My invention aims to reduce this distance; and my improvements consist, first, in forming an armature having its helices or coils composed wholly of iron wire plated with copper; and, second, in forming an armature without a magnetic core-piece, such armature being composed wholly of wire coils or helices of copper-plated iron wire and a suitable center for fastening it to a shaft.

Referring to the accompanying drawings, which illustrate an armature constructed according to my invention, A designates the wire composing the same. Said wire is formed of an iron-wire core, $a$, having a plating or sheathing, $a'$, of copper, and a wrapping or coating, $a^2$, of fiber or other insulating material. This wire is wound to form coils or helices B B, each of which is as solid as may be—that is, with as small a central opening as possible. These coils are united in the usual manner to form an armature-ring, the inside end of one coil being secured to the outside end of the next and to a commutator. This, with the addition of a suitable center, D, to secure it on its shaft, constitutes the entire armature. If desired, the coils may be wrapped on a wooden or other non-conducting former or core and permitted to remain thereon, such core or center merely giving stability to the armature without affecting the electrical functions of the latter.

In practice I make a larger number of convolutions and use thicker wire than is ordinarily used for armature-coils, proportioning the number of such coils and the thickness of the wire so that an armature of my improved construction shall contain about as much iron and copper as an ordinary armature of standard or approved construction does.

Inasmuch as the coils of my improved armature are composed of iron, and as these coils come closer up to the armature than the iron core of an ordinary armature, it follows, from the principle stated, that more powerful magnetic or inductive effects are obtained than those pertaining to armatures of the ordinary construction; and inasmuch as the iron wire is plated with copper it follows that the currents generated find as good, or indeed the same, conducting medium for their passage as they do in armatures composed of iron cores with copper coils.

I have particularized copper-plated iron wire as the material for the coils; but in lieu of wire, iron strips duly plated with copper may be employed, and such I specify and include as within my claim of invention.

What I claim as my invention is—

1. An armature for dynamo-electric machines, having its coils composed of a wire of magnetic material coated or plated with a non-magnetic material of greater conductivity than the body of the wire, substantially as and for the purpose described.

2. An armature for dynamo-electric machines, composed wholly of a series of coils of wire of a magnetic material coated or plated with a material of a substantially non-magnetic character and of greater conductivity than the material of which the body of the wire is composed, both the wire and its covering being in and forming part of the electric circuit, substantially as described.

3. An armature composed of a series of coils of wire of magnetic material coated with a non-magnetic conductor and mounted on a suitable center, substantially as described.

In testimony that I claim the foregoing I have hereunto set my hand this 22d day of February, 1882.

CHAS. E. BALL.

Witnesses:
S. J. VAN STAVOREN,
CHAS. F. VAN HORN.